United States Patent
Casado et al.

(10) Patent No.: US 11,154,782 B2
(45) Date of Patent: *Oct. 26, 2021

(54) METHOD AND APPARATUS FOR PROVIDING A COMPUTER IMPLEMENTED GAME

(71) Applicant: KING.COM LIMITED, St. Julians (MT)

(72) Inventors: Carlos Casado, Barcelona (ES); Marc Pestka, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,495

(22) Filed: Mar. 16, 2020

(65) Prior Publication Data
US 2020/0215438 A1 Jul. 9, 2020

Related U.S. Application Data

(63) Continuation of application No. 15/692,365, filed on Aug. 31, 2017, now Pat. No. 10,589,178.

(51) Int. Cl.
| | |
|---|---|
| A63F 9/24 | (2006.01) |
| A63F 13/00 | (2014.01) |
| G06F 17/00 | (2019.01) |
| A63F 13/69 | (2014.01) |
| A63F 13/822 | (2014.01) |
| A63F 13/79 | (2014.01) |
| A63F 13/335 | (2014.01) |
| A63F 13/35 | (2014.01) |
| A63F 13/795 | (2014.01) |

(52) U.S. Cl.
CPC ............ *A63F 13/69* (2014.09); *A63F 13/335* (2014.09); *A63F 13/35* (2014.09); *A63F 13/79* (2014.09); *A63F 13/795* (2014.09); *A63F 13/822* (2014.09)

(58) Field of Classification Search
CPC ............................ G07F 17/3276; A63F 13/69
See application file for complete search history.

(56) References Cited

U.S. PATENT DOCUMENTS

| | | | | |
|---|---|---|---|---|
| 2004/0198481 | A1* | 10/2004 | Herrington | G07F 17/32 463/13 |
| 2005/0161883 | A1* | 7/2005 | Lipscomb | G07F 17/3293 273/292 |
| 2006/0160596 | A1* | 7/2006 | Sato | G07F 17/32 463/16 |
| 2010/0304822 | A1* | 12/2010 | Okada | G07F 17/34 463/16 |

(Continued)

*Primary Examiner* — Milap Shah
*Assistant Examiner* — Jason Pinheiro
(74) *Attorney, Agent, or Firm* — Saul Ewing Arnstein & Lehr LLP

(57) ABSTRACT

A display of a computer device displays a plurality of different levels of a computer implemented game and a first reward item. The first reward item is associated with a first level which has yet to be completed. At least one processor determines that a player has reached the first level and in response thereto, the display displays a second reward item. The second reward time associated with a second different level of said computer implemented game which has yet to be completed and a time limit. If the player reaches the second level within said time limit, a game reward is provided.

29 Claims, 11 Drawing Sheets

(56) References Cited

U.S. PATENT DOCUMENTS

2014/0141874 A1* 5/2014 Amaitis ............ G07F 17/3258
 463/27
2014/0256394 A1* 9/2014 Katz .................. G07F 17/329
 463/17

* cited by examiner

METHOD AND APPARATUS FOR PROVIDING A COMPUTER IMPLEMENTED GAME

CROSS-REFERENCE TO RELATED APPLICATIONS

This is a continuation of U.S. application Ser. No. 15/692,365, filed on Aug. 31, 2017, the entire contents of which being fully incorporated herein by reference.

FIELD OF THE INVENTION

Embodiments of this application relate to a user device and a server for use in playing a computer implemented game.

Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object.

So-called "saga-games" are known where there are many different levels which a user can play. One technical challenge with such games is how to provide technical complexity of a game whilst at the same time providing a varied gaming experience for the user.

This patent specification describes not only various ideas and functions, but also their creative expression. A portion of the disclosure of this patent document therefore contains material to which a claim for copyright is made and notice is hereby given: Copyright King.com Limited 2017 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provide a computer device comprising a display, a user interface, at least one memory, and at least one processor, said at least one processor configured to: cause said display to display a plurality of different levels of a computer implemented game and a first reward item, at least one of said levels being a level of said computer implemented game which has yet to be completed, said first reward item being associated with a first level of said computer implemented game which has yet to be completed; determine that a player of said game has reached said first level associated with said first reward item and in response thereto cause said display to display a second reward item, said second reward item being associated with a second different level of said computer implemented game which has yet to be completed and a time limit; and determine if said player of said game has reached said second level within said time limit and if so, cause a game reward to be provided.

The first level may have to be completed before said player can progress to said second level.

The first level may be separated from said second level by at least one other levels.

The first level may be separated from the second level by a plurality of other levels.

The at least one processor may be configured to determine that said second level has not been reached within the time limit, and in response to cause said second reward item to be removed from the display.

The at least one processor may be configured to determine that said second level has not been reached within the time limit, and in response to cause a further second reward item to be provided with a respective time limit.

The at least one processor may be configured to determine if computer device is online and to only cause at least one of said first and second items to be provided if said player is online.

The at least one processor may be configured to determine a current level of said player and in dependence on said current level determine if said first reward item can be provided The game may comprise a plurality of sets of levels and said at least one processor may be configured to determine a current level of said player within a respective set and only provide said first reward item if there are more than n levels to an end of said respective set, where n is an integer.

The at least one processor may be configured to determine when said first reward item is to be provided using a random or pseudo random criteria.

According to another aspect, there is provided a computer device comprising a display, a user interface, at least one memory, and at least one processor, said at least one processor configured to: provide a first game reward item in a computer implemented game; determining if at least one game objective associated with the first game reward item has been achieved and when said first game objective has been achieved, providing a second game reward item associated with the first game item, said second game reward item being associated with a time limit and a second game objective; and determining if a player of a game has achieved said second game objective within said time limit and if so, cause a game reward to be provided.

According to another aspect, there is provided a computer device comprising a display, a user interface, at least one memory, and at least one processor, said at least one processor configured to: cause said display to display a plurality of different levels of a computer game, at least one of said levels being a level of said computer implemented game which has yet to be completed and an item, said first reward item being associated with a first level of said computer implemented game which has yet to be completed, a time limit being associated with said first item; and determining if a player of a game has reached said first level within said time limit and if so, cause a game reward to be provided.

According to another aspect, there is provided a computer device comprising a display, a user interface, at least one memory, and at least one processor, said at least one processor configured to: cause said display to display a plurality of different levels of a computer implemented game and a first reward item, said first reward item being associated with a first level of said computer implemented game; determine that a player of said game has reached said first level associated with said first reward item and in response thereto cause said display to display a second reward item, said second reward item being associated with a second different level of said computer implemented game and a time limit; and determine if said player of said game has reached said second level within said time limit and if so, cause a game reward to be provided.

A computer implemented method for providing a computer implemented game on a computer device comprising a display, a user interface, at least one memory, and at least one processor, said at least one processor configured to cause the steps of: causing said display to display a plurality of different levels of a computer implemented game and a first reward item, at least one of said levels being a level of said computer implemented game which has yet to be completed, said first reward item being associated with a first level of said computer implemented game which has yet to be completed; determining that a player of said game has reached said first level associated with said first reward item and in response thereto cause said display to display a second item, said second reward item being associated with a second different level of said computer implemented game which has yet to be completed and a time limit; and determining if said player of said game has reached said second level within said time limit and if so, cause a game reward to be provided.

The first level may have to be completed before said player can progress to said second level.

The first level may be separated from said second level by at least one other levels.

The method may comprise determining that said second level has not been reached within the time limit, and in response causing said second reward item to be removed from the display.

The method may comprise determining that said second level has not been reached within the time limit, and in response causing a further second reward item to be provided with a respective time limit.

The method may comprise determining if the computer device is online and only causing at least one of said first and second items to be provided if said computer device is online.

The method may comprise determining a current level of said player and in dependence on said current level determining if said first reward item can be provided The game may comprise a plurality of sets of levels and the method may comprise determining a current level of said player within a respective set and only providing said first reward item if there are more than n levels to an end of said respective set, where n is an integer.

The method may comprise, when said first reward item is to be provided, using a random or pseudo random criteria.

According to another aspect, there is provided a non-transitory computer readable storage device storing instructions that, when executed by at least one processor of a computer device causes the at least one processor to: cause a display to display a plurality of different levels of the computer implemented game and a first reward item, at least one of said levels being a level of said computer implemented game which has yet to be completed, said first reward item being associated with a first level of said computer implemented game which has yet to be completed; determine that a player of said game has reached said first level associated with said first reward item and in response thereto cause said display to display a second reward item, said second reward item being associated with a second different level of said computer implemented game which has yet to be completed and a time limit; and determining if said player of said game has reached said second level within said time limit and if so, cause a game reward to be provided.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF SOME EMBODIMENTS

One example of a game with which embodiments may be used is a 'match-3 game' where the player is required to find patterns on a seemingly chaotic board. The player then has to match three or more of the same type of game element on the game board and those matched elements will then disappear. In some games the user has to match more than 3 game elements.

Figure 1A:
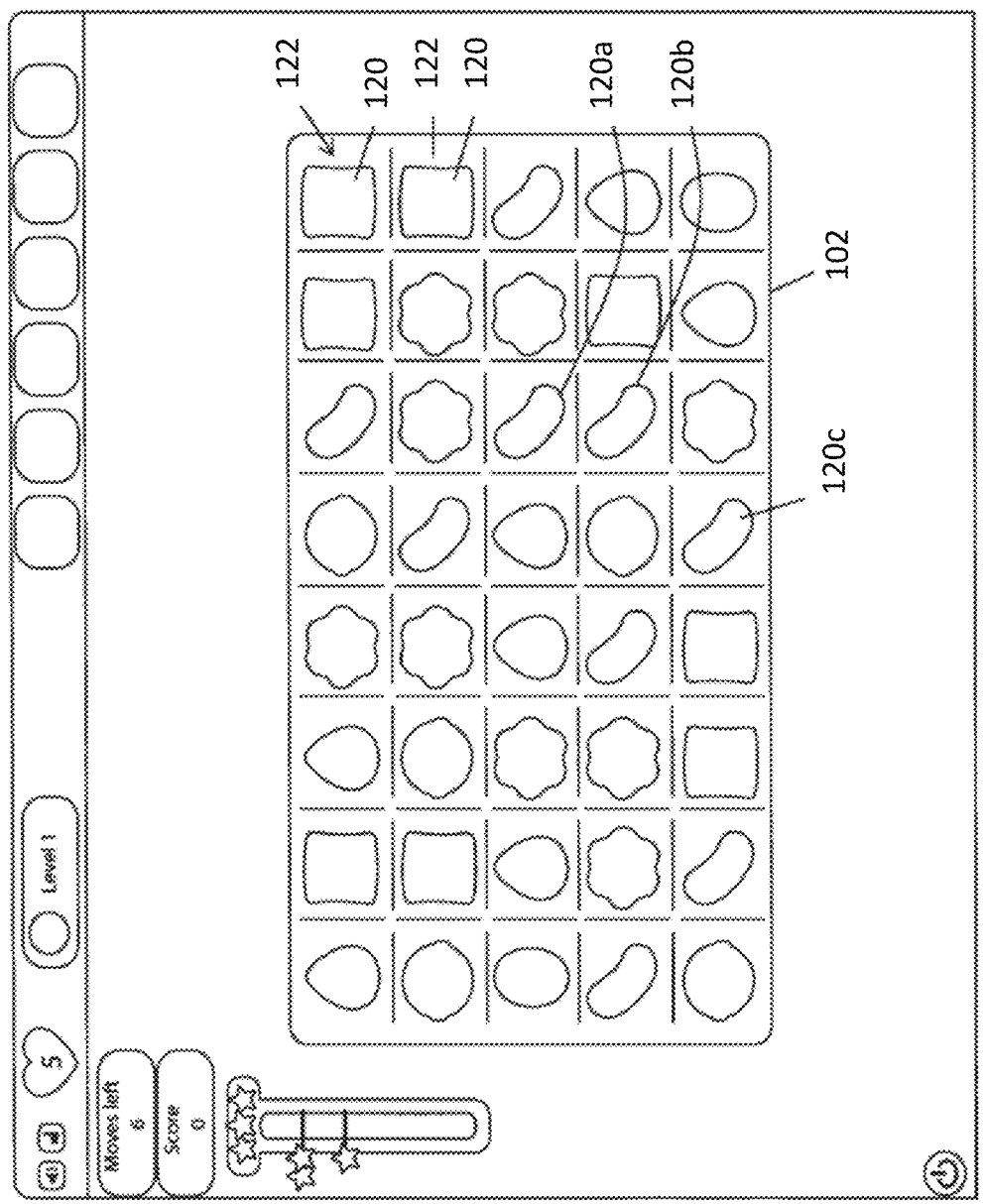
FIG. 1a shows a first example embodiment of a game board.

FIG. 1a shows a display of a known version of a match 3 switcher game called Candy Crush Saga™. FIG. 1a illustrates a game board 102 with a plurality of game elements 120. The game elements are each of six different shapes and colours. Each game element is supported by a tile 122. The tiles may not be readily visible to a player of the game—the game elements are the main focus for a player. However, the tiles govern characteristics of the game elements which are visible to a player.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1a that game element 120c is moved one place to the right to form a three-line match with game elements 120a and 120b. This has the effect of removing game elements 120a, 120b and 120c", creating a visual effect (for example an animation) on the screen to indicate the removal of the game elements. The two game elements which were directly above game elements 120a will now fall downwards into the spaces created by the removal of game elements 120a, 120b and 120c. The game elements on the newly created tiles which fall downwards into the game board are generated at random. The user then has a new game board on which to play a subsequent move.

Another example are the so called 'clicker' games where the player can click on a group of adjacent game elements of a certain type and those will then be removed. Some clicker games only require two adjacent objects to remove those elements if clicked by the user. Others may require more than two.

Figure 1B:
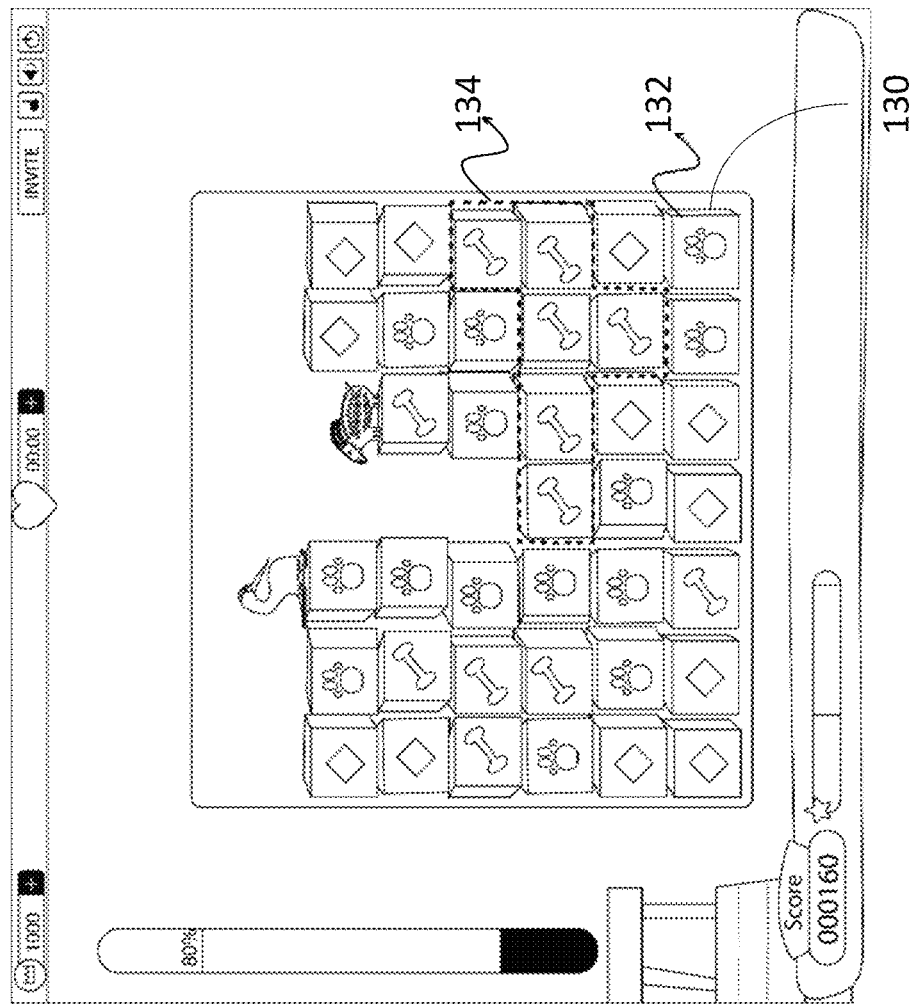
FIG. 1b shows a second example embodiment of a game board.

FIG. 1b shows a display of a known version of a clicker game called Pet Rescue™. FIG. 1b illustrates a game board 130 with a plurality of game elements or blocks 132.

To play the game, the user will, via a user interface, click on any group of two or more touching blocks of the same colour. In the example shown in FIG. 1b, the user has clicked on the group referenced 134 and surrounded by dotted lines. Clicking on this group will cause these blocks to be removed from the game board. In some embodiments, new blocks will not appear on the game board. The remaining game element blocks drop down and slide left to fill gaps on the game board. There may be elements blocking the game elements to fall down or slide left and the game designer may implement certain rules for certain game elements.

Another type of match games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

It is clear that embodiments may be used with any other suitable type of games. The previously described games are by way of example only.

In some embodiments, the game may be provided with different levels. Each level may have a specific goal.

Figure 2:
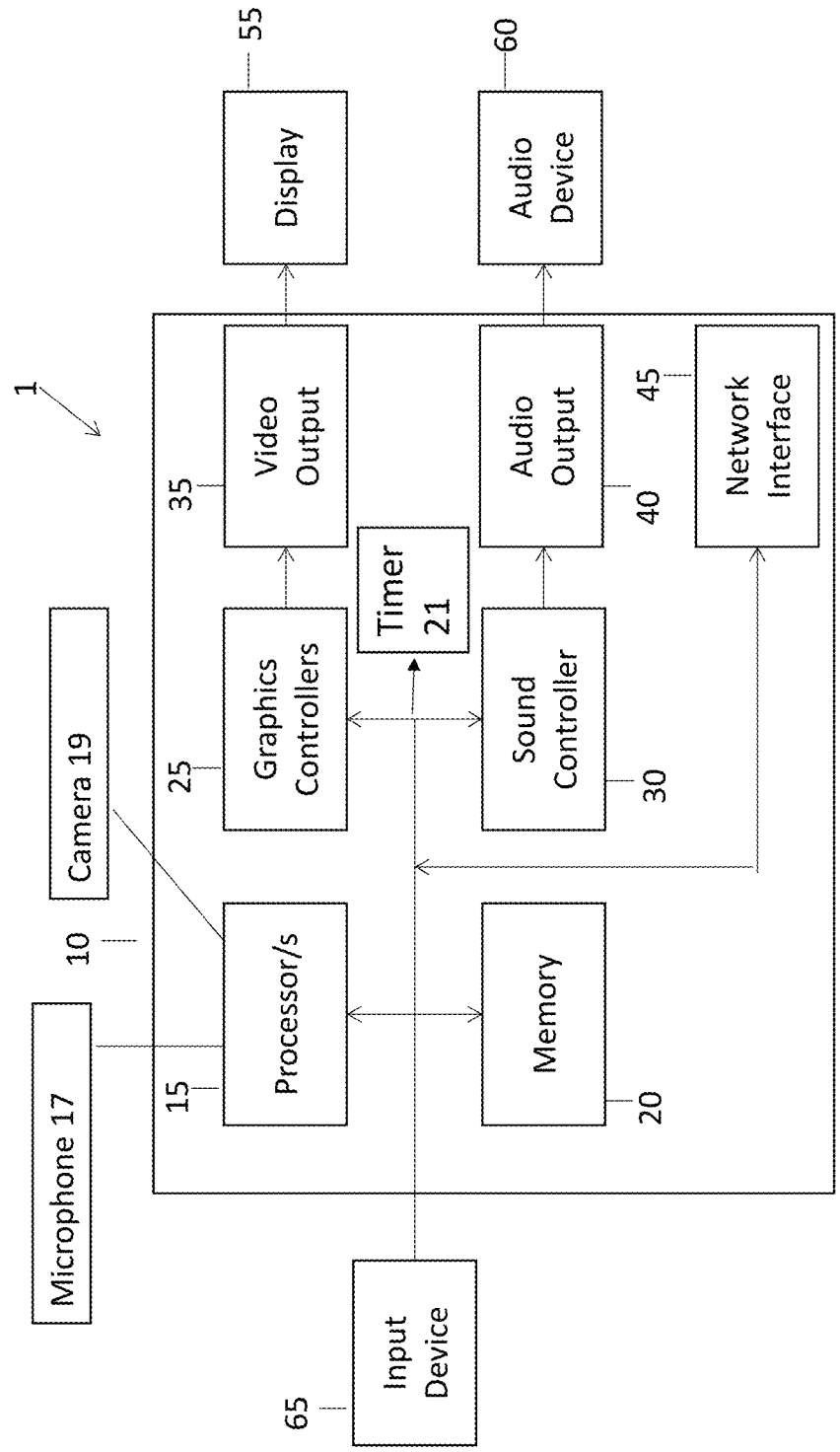
FIG. 2 shows an example user device in which some embodiments may be provided.

A schematic view of a user device 1 according to an embodiment is shown in FIG. 2. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments.

A timer 21 may be provided. The timer may be a hardware function, a software function or a combination thereof. The timer may be provided by the at least one processor, in some embodiments. The timer may provide a count up function and/or a countdown function.

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small with a relatively small touch screen.

Figure 3:
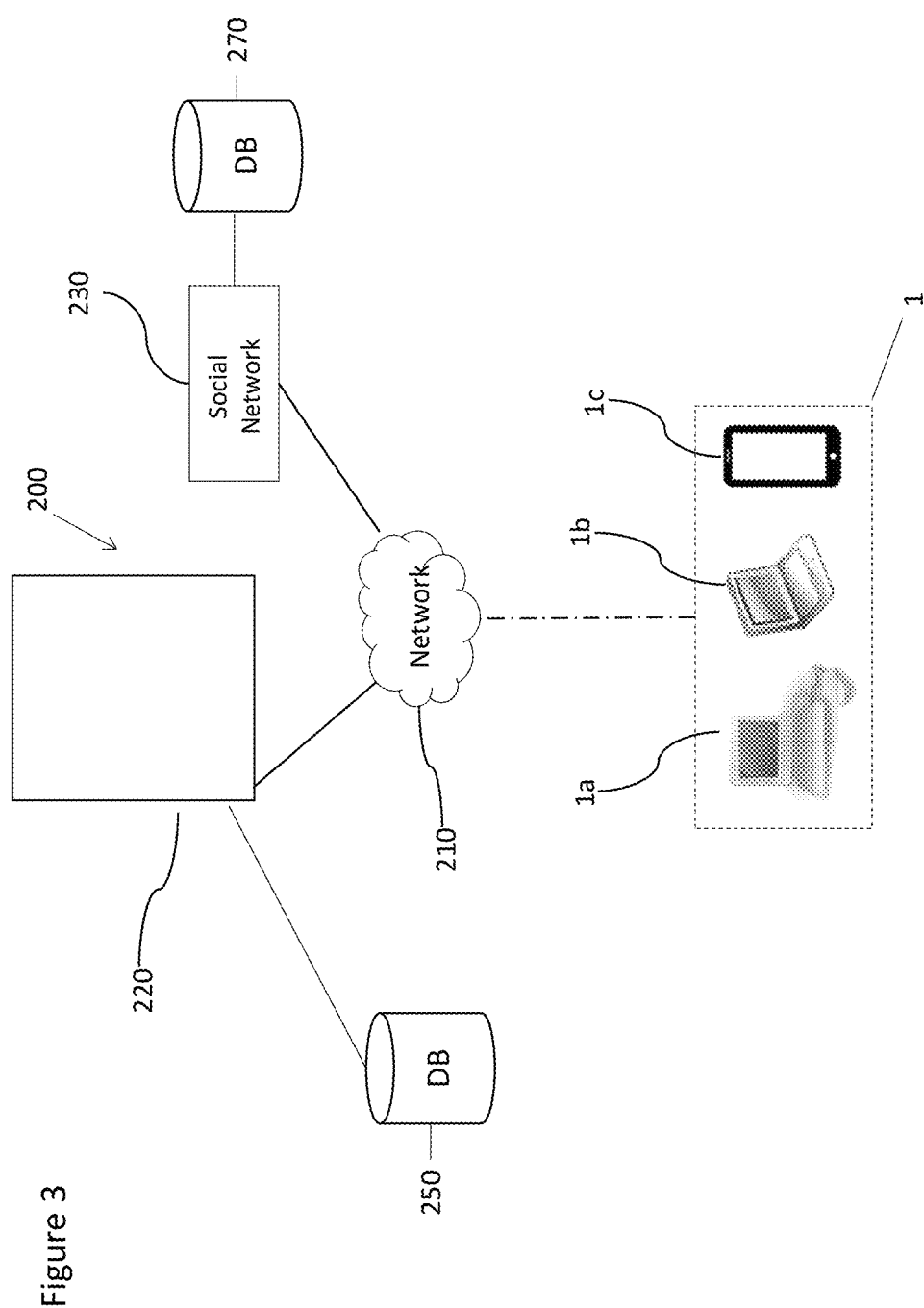
FIG. 3 shows an example system in which some embodiments may be provided.

FIG. 3 schematically shows a system 200 according to an embodiment. The system 200 comprises a server 220 which may store or be in communication with database 250 which may, in some embodiments, store game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 to one or more client or user devices 1, shown in FIG. 3 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices 305. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be implemented to synchronize game state information and/or retrieve and connect to social graph information and user profile data on a social network such as Facebook or Google+™.

Some embodiments may be implemented to enable connection to a plurality of social networks. The user may be given the option to select which information may be derived and/or shared with which social network.

Some embodiments may be provided in the context of so-called saga games. These are games which have one or more levels. In some games, a user may be required to complete a certain level before the user is able to progress to a next level. In some embodiments, the user may be able to go back and play any previous level.

A game may have a number of different levels. Different levels may have different requirements to be met. For example, some levels may have one or more specific goals. These goals could be to reach a certain amount of points before running out of moves or time; to bring down certain game elements to the bottom of the screen; to remove a certain amount of game elements before running out of moves or to collect certain game elements through specific matches before running out of moves. These are by of example only, and any other additional or alternative goals may be provided.

Figure 5:
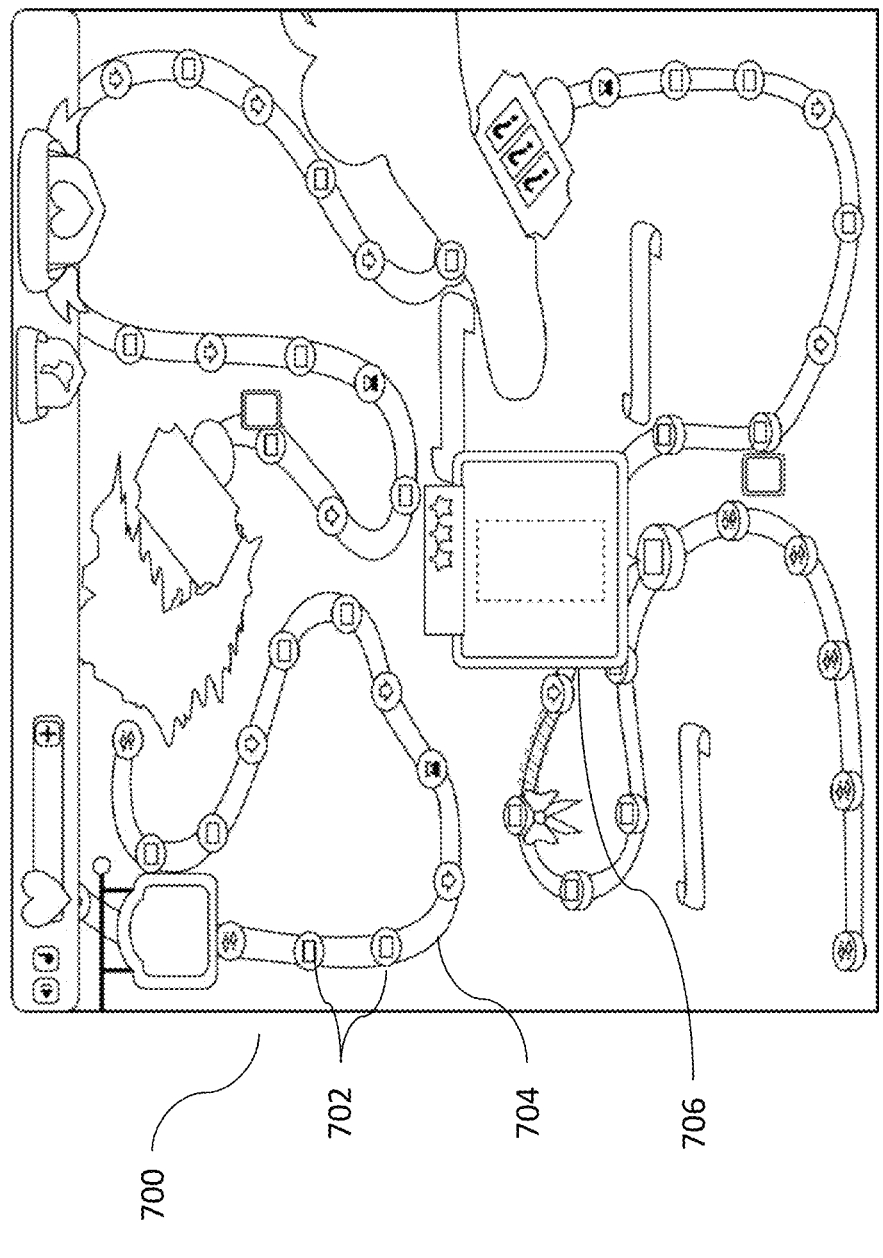
FIG. 5 schematically shows a representation of different levels of a game.

In some embodiments, the different levels may be represented on a map 700. FIG. 5 schematically shows one example of such a view. Different levels 702 are represented on a path 704 so that the user can see the progress which he has made playing the game. The different levels may be displayed in a first manner and/or with first information if the level has not been completed and in a second manner and/or with second information if the level has been completed. For example, the icon used to represent a level which has been completed may be different to that for a level which has not been completed.

In some embodiments, one of the levels which have been completed or not completed is displayed with an indication. The other of the levels which have been completed or not completed may be displayed without the indication. For example, the icons representing a level are the same regardless of whether the level has been completed or not. A separate indication may be displayed next to an icon for a particular level indicating if the level has been completed. Alternatively a separate indication may be displayed next to an icon for a particular level indicating if the level has been not been completed. Alternatively a first separate indication may be displayed next to an icon for a particular level indicating if the level has been not been completed and a second separate indication may be displayed next to an icon for a particular level indicating if the level has been completed.

This representation also allows a user to go back and replay levels which he has previously played. The map view may show what levels have been completed as well as how many levels are left to play. Throughout the game and for each level completed, the player journeys across the map. In some embodiments, the levels are divided up into groups or chapters or stages. These may be referred to as episodes. In some embodiments, there may be a theme associated with each chapter.

In some embodiments, if the player has connected to a social network, then friends' progress from the same network may be viewed on the map by the means of information provided next to the highest level they have currently reached or by virtual of a league table which can be displayed.

In the map view, the player can hover over a level to display a thumbnail 706 of it. This makes it easier to find specific already completed levels, and can also give the player an idea of what to expect before actually starting a level. In some embodiments, thumbnails can be displayed for any level. In some embodiments, no thumbnails can be displayed for levels that have not yet been reached. In some embodiments, the thumbnail option is not provided.

Information may be provided on the map to display how well the player has done on the level if he has played it previously. This can for instance be represented with the number of stars the player has received on that level, the actual score or some other indication. This may be done via the thumbnail option, by displaying information on the map or by any other suitable mechanism.

When navigating on a map in a game, it may sometimes be difficult to find desired level or area of the map if the map is, for example, too large relative to the available display. In some embodiments, a smaller version 720 of the map is displayed. The user is able to select a part of that map to be displayed on the display such that the part of the map displayed is larger than when the entire map is displayed. The smaller version of the map will highlight the part of the map which is being displayed in enlarged from.

Figure 6:
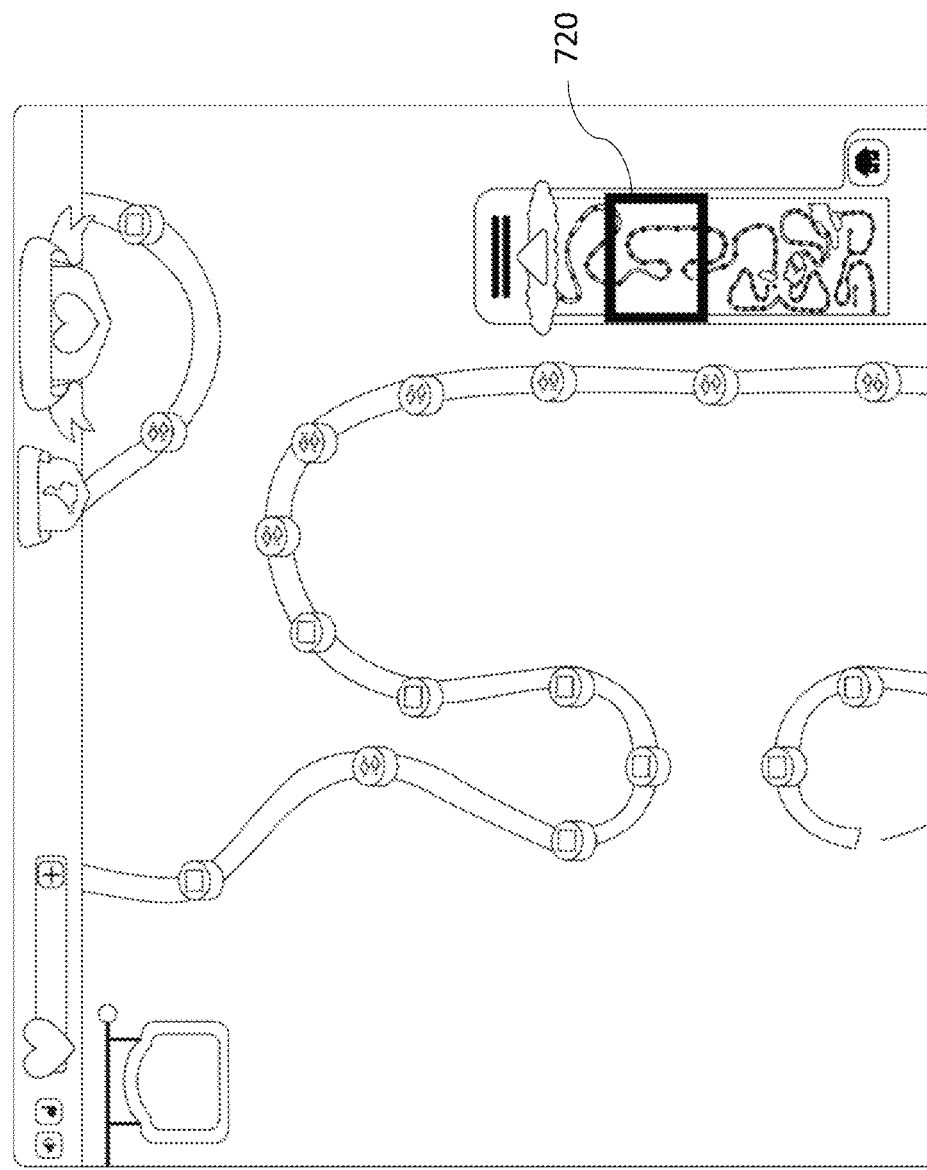
FIG. 6 schematically shows a zoomed representation of some of the different levels of the game.

In some embodiments, the smaller version of the map is only in full view when the player needs it; the rest of the time the smaller version of the map may be hidden with only a small part of it showing. Clicking on this small part will expand the smaller version of the map such as shown in FIG. 6 and referenced 720 and let the player use it. Clicking on the same part again will once more hide the smaller version of the map. When the smaller version of the map is expanded, the player is provided with a mini map showing an area of the map. The player can select anywhere on the mini map and when doing so the main view will jump to the same location, but zoomed in. The player may also scroll through the mini map which will then simultaneously scroll the map in the main view.

In some embodiments, the game can be implemented so that a player progresses through multiple levels. The different levels may have different levels of difficulty in some embodiments. For example, the trend may be for the levels to become increasingly difficult. However, in some embodiments, the difficulty of individual levels may vary within the progression from easier to harder to easier and so on.

As the player travels through the levels in the game, his progress may be represented as a journey along a path in the virtual map.

In some embodiments, the player moves between levels and completes the levels one by one along a path by playing the associated game. When the player reaches the goal of a level, the next level is unlocked and the player can play that level in the game.

The number of groups and levels can vary depending on the implementation. The levels may be numbered consecutively throughout the game or they can be numbered within a group, it is also understood that other ways of identifying the levels can be provided.

One way of unlocking new groups is to complete the last level on the latest group. The user may in some embodiments be provided with challenges to unlock the next group in the virtual map.

In some embodiments, the user can play any of the unlocked levels on the map, so the user can go back and replay already completed levels to get a better score or beat friends' high scores.

It should be appreciated that the map representation is only one way in which progress in a game may be shown. In other embodiments, for example, a list of levels may be provided with an indication of how far in the list the player has progressed.

Some embodiments are configured to provide a reward to a player.

In some embodiments, the reward may be achieved through two steps. Firstly a first reward item has to be "captured" or acquired by a user and then the first reward item has to be "unlocked". When the first reward item is unlocked a game reward is provided.

In some embodiments, the first reward item may be displayed until the player reaches the level associated with the first reward item. The first reward item may be displayed in association with a level which the player has yet to reach in some embodiments. In other embodiments, the first reward item may be displayed in association with a previously played level.

In some embodiments, a first reward item may be provided relatively frequently, for example every second session. In other embodiments, a first reward item may be provided more or less frequently than this. In some embodiments, a new first reward item may only be provided if the previous first reward item has been "unlocked". In other embodiments, it is not necessary that the previous first reward item has been unlocked in order for a further first reward item to be provided.

In some embodiments, the player will find first reward items such as a treasure chests relatively close to his/her current position in the game map. The first reward item or treasure chest may be achievable by a relatively small progression in some embodiments.

The reward mechanism may comprise of two separate parts. In some embodiments, the first part is visually represented by a first reward item (for example a treasure chest) and the second part by a second reward item (for example a chest key). In one embodiment a first reward item, for example in the form of a treasure chest is provided ahead but relatively close to the player's current position on the game board in association with a level yet to be played. The reward provided by the first reward item may be unknown. The player progresses normally by playing the game until reaching the level associated with the first reward item, for example the chest. The player now "owns" the first reward item or chest, but the chest cannot be opened without a second reward item, for example a key. When a first reward item is owned or acquired by a player, it may be added to a player's inventory and/or displayed in a particular location. An example of this is shown in relation to FIG. 8 which is described later.

A second reward item, for example key appears in the map, ahead but relatively close to the player's current position. The second reward item may be displayed in association with a level which the user has not yet reached. There is a time limit to reach the level associated with the second reward item or key, by playing through the levels between a player's current level and the level associated with the second item.

If the player reaches the second item or key within the time limit, the chest content (reward) is provided to the player. The reward may be any suitable in game item. If the player does not reach the second item (key) within the time limit, the second item disappears from the map but the first item or chest remains as the player's property. After a while, a new second item or key will be offered.

A random effect, a pseudorandom effect or a weighting may be used to control one or more of:

First reward item placement (e.g. chest placement)—for example the level at which the first reward item is provided;

Second reward item placement (e.g. key placement)—for example the level at which the second reward item is provided;

Time when one or more of the first and second reward items appear in the map;

Timer length associated with the second item; and

The game reward provided.

In other embodiments, one or more of the factors above may be defined either on a game basis or at least partially in dependence on where the user is in the game.

Figure 9:
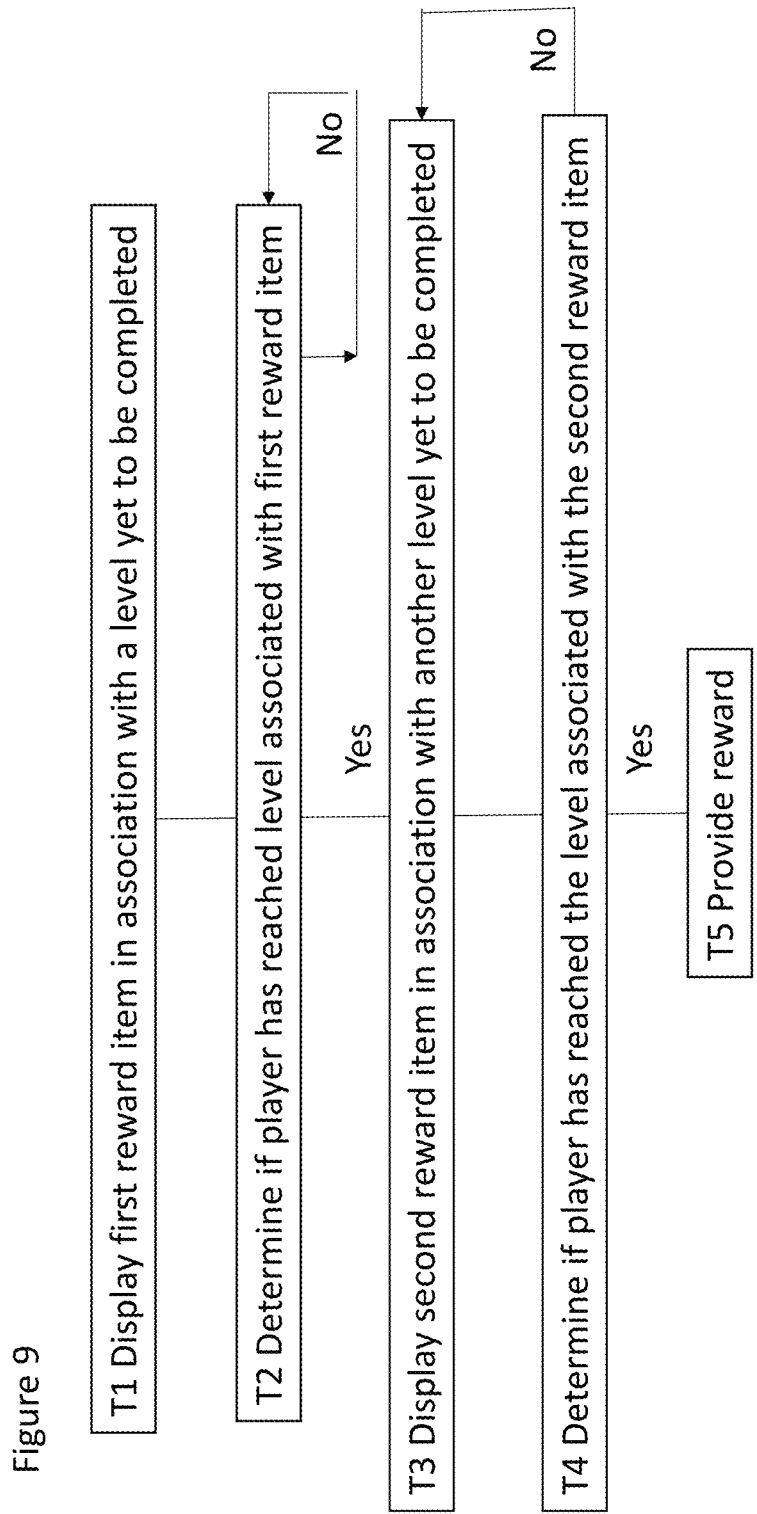
FIG. 9 shows another embodiment.

Reference is made to FIG. 9 which shows a method flow of some embodiments.

In step T1, a plurality of different levels of a computer implemented game and a first reward item are displayed. In some embodiments, the first reward item is associated with a level which has yet to be completed. The levels may be represented in any suitable manner.

In step T2, a determination is made as to whether the player has reached the level associated with the first reward item. If not, step T2 is repeated.

If so, the next step is step T3 in which the display is controlled by at least one processor to display a second reward item. The second reward item is associated with a second different level of said computer implemented game which has yet to be completed and a time limit.

In step T4, it is determined if the player of the game has reached the second level within the time limit.

In some embodiments, if not, the next step is step T3, which provides a new second reward item. The new second reward item may be provided at a third or at the second level of the computer implemented game. The third level may be one which is yet to be completed. The third level may be further from the first level than the second level. The time limit associated with the new second reward item may be the same or different to that provided with the previous second reward item.

In other embodiments, the next step may instead be to end the method. For example, the second reward item may only be displayed once. If the player of the game has not reached the second level within the time limit, the first reward item may be removed from the display and may no longer be available for the player to acquire.

If so, the next step is step T5 in which the at least one processor causes the game reward to be provided in the computer game.

Figure 4A:
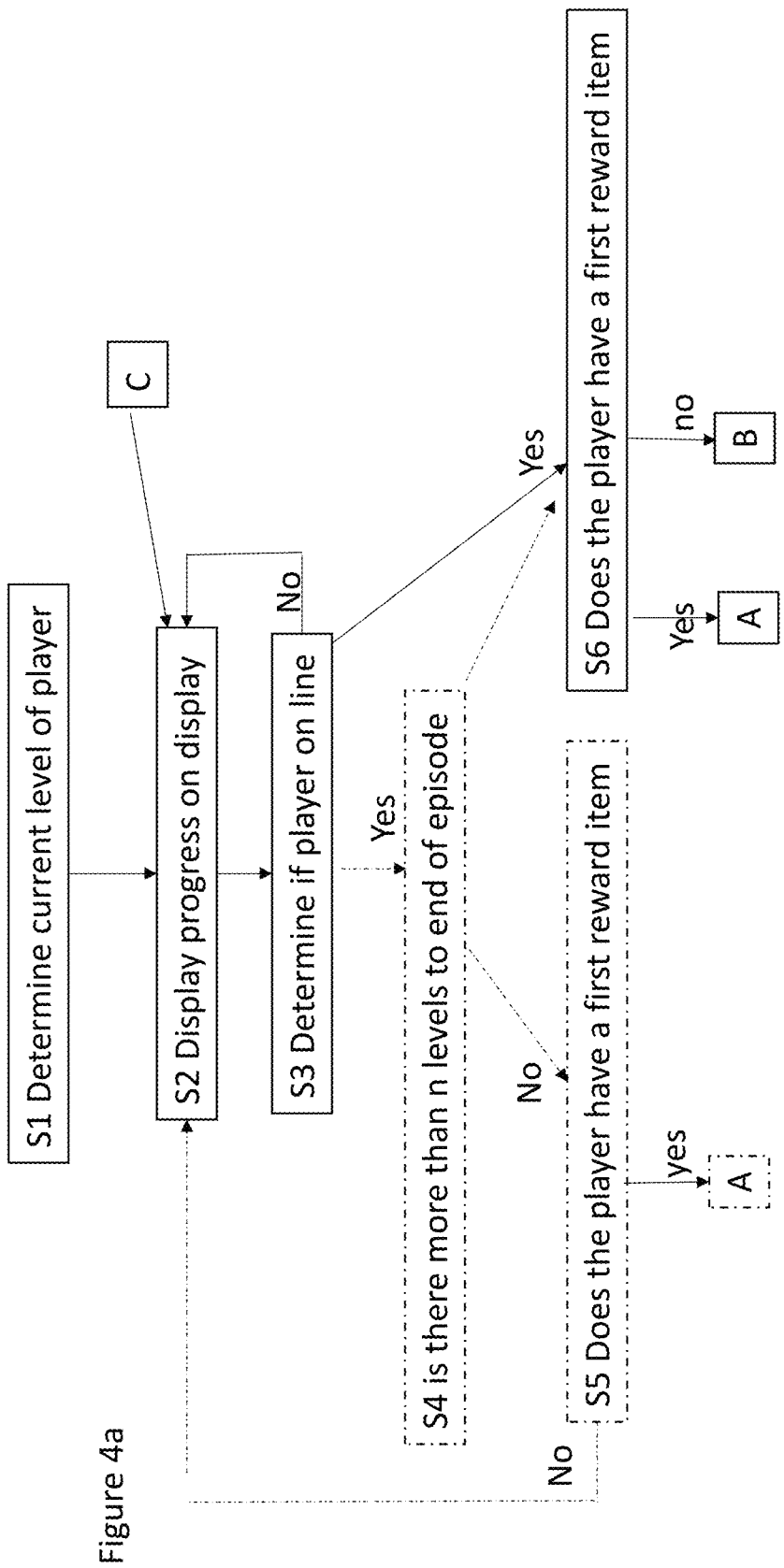
FIGS. 4a and 4b shows a method of an embodiment.
Figure 4B:
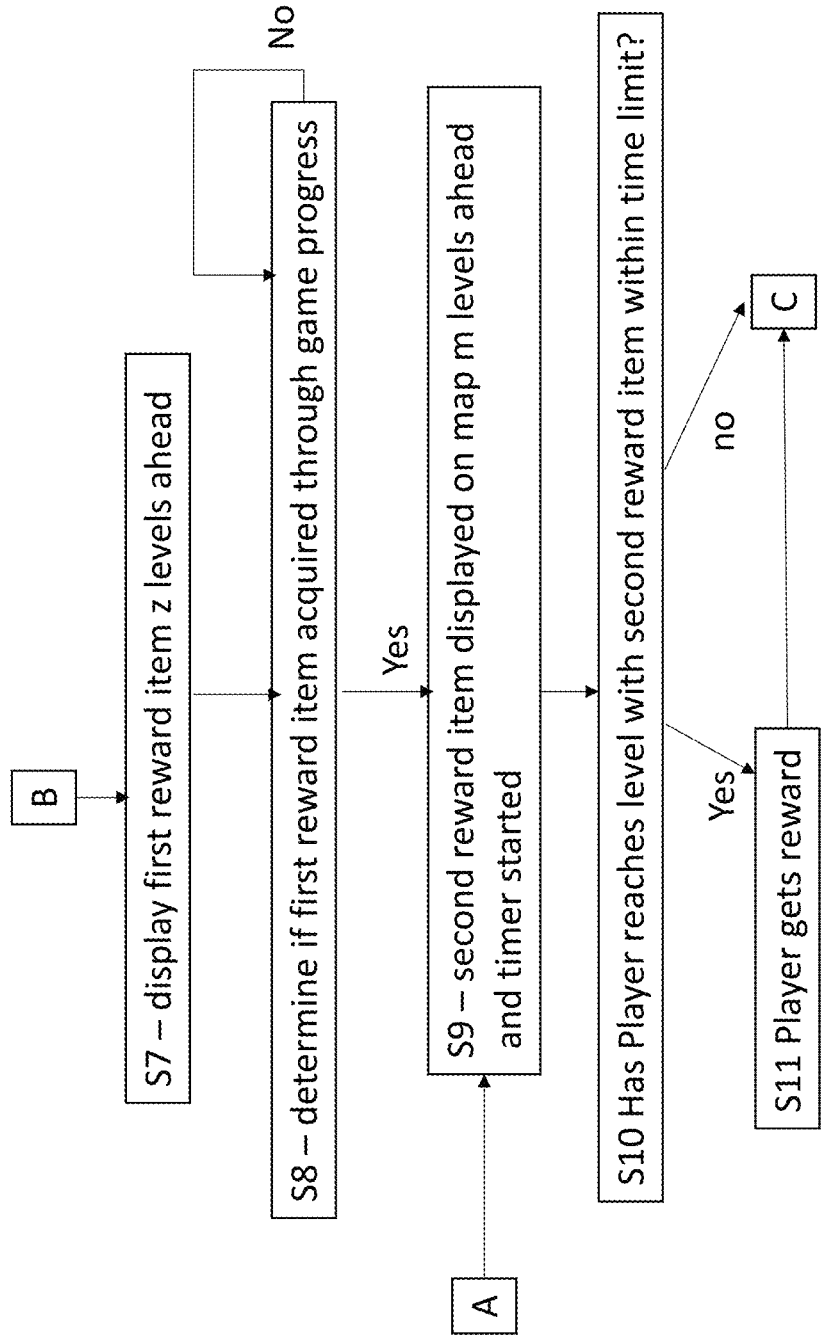

Reference is made to FIGS. 4a and 4b which show another example method of an embodiment.

In step S1, a determination is made by at least one processor of the user device as to the current level of a player.

In some embodiments, the reward mechanism is only available if the player has reached at least a certain level in the computer implemented game. This may be represented by a given progress through a map.

In some embodiments, there is no limitation as to the availability of the reward mechanism and the reward mechanism may potentially be available regardless of the current level of the player.

In some embodiments, the game is divided into sets of levels. These sets of levels may be referred to as episodes. In some embodiments, the reward mechanism may only be available if the user has completed x episodes, where x is an integer greater than or equal to one. It should be appreciated that x may be fixed for the game (i.e. the value of x is the same every time the game is played) or may be varied over time. The value of x may be varied randomly over time. In other embodiments, x is always the same.

In other embodiments, the requirement may be that the player has reached level y where y is an integer. It should be appreciated that y may be fixed for the game or vary over time. The value of y may be varied randomly over time.

If the at least one processor determines that the current level of the player in the computer game satisfies the requirements that the reward mechanism may be available or where there are no restrictions on the availability of a reward, the next step is S2.

In step S2, the at least one processor of the user device is configured to cause the display on the display the current progress of the player. For example, a saga map such as previously discussed may be used to show the progress of the player through the game. The image which is displayed may show the current level of the player and at least one level which has yet to be completed by the player.

In step S3, a determination is made by the at least one processor as to whether the user device is online or off-line. In some embodiments, this is optional. In this example, game play with respect to the reward may be dependent on whether the user device is off-line or online. In other embodiments, the game play with respect to the reward will be the same regardless as to whether the user device is off-line or online.

If the user device is off-line, then the next step is step S2.

If the user device is online, then the next step is step S4.

In step S4 it is determined by the at least one processor if there are more than n levels to the end of an episode. n is an integer. By way of example only n may be 3. However, n may be smaller or larger than 3. In some embodiments, step S4 may be omitted. In some embodiments, the value of n may be dependent on the episode. In other embodiments, the value of n may be the same for all episodes. The value(s) of n may be fixed for the game. In some embodiments, the value of n may be varied whilst the game is played. For example the value of n may be varied randomly.

Other embodiments may take into account different positions of the user within an episode in determining whether to provide the first reward item. For example, the first reward item may potentially be provided if the player is within a certain number of levels from the beginning of the episode, or if the player is within a given range of levels of an episode.

If there are less than n levels to the end of an episode, then the next step is step S5. In step S5, it is determined by the at least one processor if the player already has acquired the first reward item. This is the chest in one embodiment. If not, the next step is step S2. If so, then next step is step S9, which will be described in more detail later.

If there are more than n levels to the end then the next step is step S6.

It should be appreciated, that in some embodiments, steps S4 and steps S5 are optional. In these embodiments, step S3 is followed by step S6. Of course if step S3 is not provided, step S2 is followed by step S6.

In step S6, it is determined if the player already has the first reward item. This is the chest in one embodiment. If not, the next step is step S7. If so, then the next step is step S9, which will be described in more detail later.

In step S7, a first reward item is provided, for example a chest, z levels ahead of the current level of the player. z is an integer. z may be fixed for the game. z may be dependent on the level of the game. z may be varied. z may be varied randomly. z may be a relatively small number, for example, 1 or 2. In other embodiments, z may be any other suitable number.

It should be appreciated that in some embodiments, step S7 may comprise first determining if a first reward item is to be displayed on the display during a current game session and/or determining when the first reward is displayed on the display.

If the first reward item is to be displayed during a particular game session may depend on if a first reward item was provided in a previous game session, when a first reward item was last provided, may be varied or may be varied randomly.

When the first reward item is to be displayed may be fixed for the game, dependent on the level of the game, may be varied or may be varied randomly. The timing of the reward may with respect to a beginning of a session or with respect to another game reference point. In other embodiments, the timing of the reward may be controlled independently of any game reference point.

In step S8, it is determined if the first reward item (for example the chest) is acquired. If so the next step is step S9, If not step S8 is repeated. The chest may be acquired by reaching the level with which the first reward item is associated. In some embodiments, reaching the level may require the level with which the reward is associated to be completed. In some embodiments, reaching the level may require the preceding level to that associated with the reward to be completed. In this case, this would mean that the level associated with the reward can be played. The chest or first reward item is acquired through game play, that is by completing levels of the game.

In step S9, the at least one processor is configured to cause the second reward item to be provided and to cause the image displayed by the display to display this second item. In this example, this is displayed in the form of a key m levels ahead of the current level. m may be fixed for the entire game. m may be dependent on the current level of the game. m may be varied. m may be selected randomly. m is an integer. m may be relatively small. By way of example only m may be in the range 2 to 4 inclusive. However, m may fall outside this range. Associated with the second reward item is a time limit. The time limit may be provided by the timer 21. The timer may be a count up or count down timer. In some embodiments, the processor may be configured to cause time information to be displayed. The time information may take any suitable format. For example the time information may be the amount of time elapsed or the remaining time or a suitable graphic image.

It should be appreciated that if a previous attempt to reach the level associated with the second reward item has failed within the time limit, another second reward item is provided in due course or straight way. This second reward item may be associated with the same or a different level. The same or a different time limit may be associated with the further second item. In another embodiment, the second reward item may be retained but the timer is restarted. In some embodiments, there may be provided an unlimited number of second items provided each time the respective level is not reached within the respective time limit. In other embodiments, there may be a limit on the number of second items which can be provided. When that limit is met, the first reward item may be removed from the player's ownership.

In step S10 it is determined by the at least one processor if the player has reached at least the level associated with the second reward item. In some embodiments, reaching the level may require the level with which the reward is associated to be completed. In some embodiments, reaching the level may require the preceding level to that associated with the reward to be completed.

If not, the next step is step S2. The second object will be removed from the image displayed.

If so, the next step is step S11, where the at least one processor is configured to provide the reward to the player.

In some embodiments, the reward which is provided may always be the same. In some embodiments, the reward may be dependent on the level in the game. In some embodiments, a plurality of different rewards may be provided. The rewards may be selected randomly or pseudo randomly. In some embodiments, at least some of the rewards may be associated with a weighting which is used to determine which of the rewards is provided. Different rewards may be associated with different weightings. In some embodiments, a defined list of rewards is provided in a defined order.

In some embodiments the number of rewards may be one or more. The number of rewards provided may always be the same or may differ.

The reward provided may be dependent on the game which is being played. For example the reward may comprise one or more of a booster item, in-game currency, one or more extra lives, one or more extra moves, extra time for playing a game, a power for a game object, one or more items to customise a game object and/or the like.

In some embodiments, a first item may sometimes provide no reward.

In some embodiments a plurality of different first reward items may be provided. Different rewards may be associated with different ones of the first reward items. The different first reward items may have a different visual appearance. In some embodiments, one or more first reward items may be associated with a respective reward or subset of rewards. Alternatively or additionally, in some embodiments, one or more first reward items may be capable of providing any of the available rewards.

Alternatively or additionally a time limit may be provided in association with the first reward item. Thus, a time limit may be provided in association with the first reward item and not the second reward item in some embodiments. A time limit may be provided in association with the first reward item and the second reward item in some embodiments. A time limit may be provided in association the second reward item but not with the first reward item in some embodiments.

The time limit for the first reward item may be the same or different to the time limit associated with the second reward item, where provided.

The time limit may be varied. The time limit may be varied randomly or pseudo randomly. The time limit may be dependent on the level and/or the game.

Information about the time limit may be displayed. The information may be displayed in association with the first and/or second reward item.

Figure 7:
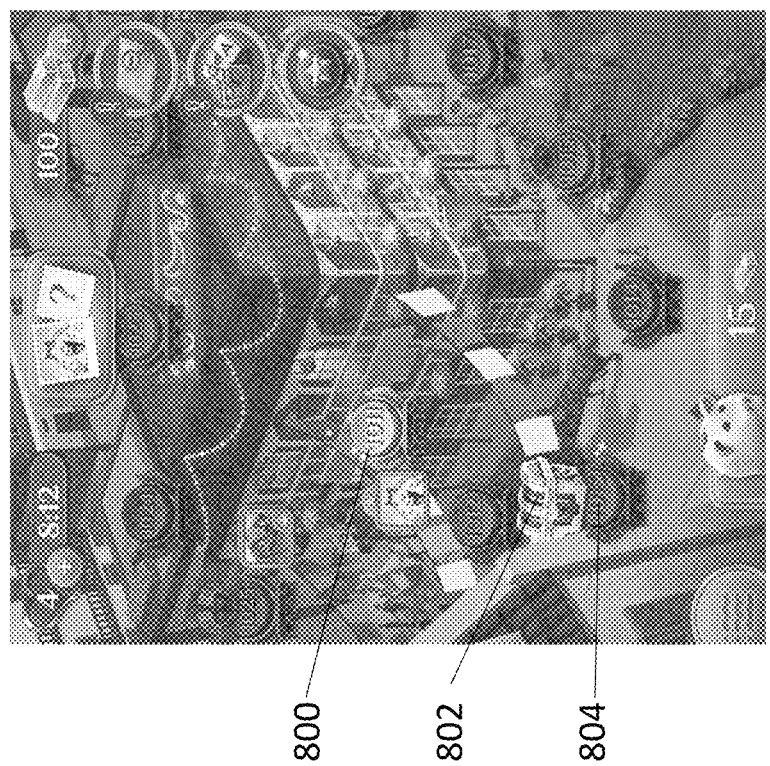
FIG. 7 shows an example of a map of different levels with a first reward item shown.

Reference is made to FIG. 7 which shows an example of part of a map in one example computer implemented game which is displayed on the display. In this part of the map which is displayed level 1011, referenced 800, is the player's current level. A first item, in the form of a chest 802 is shown two levels ahead at level 1013, referenced 804.

Figure 8:
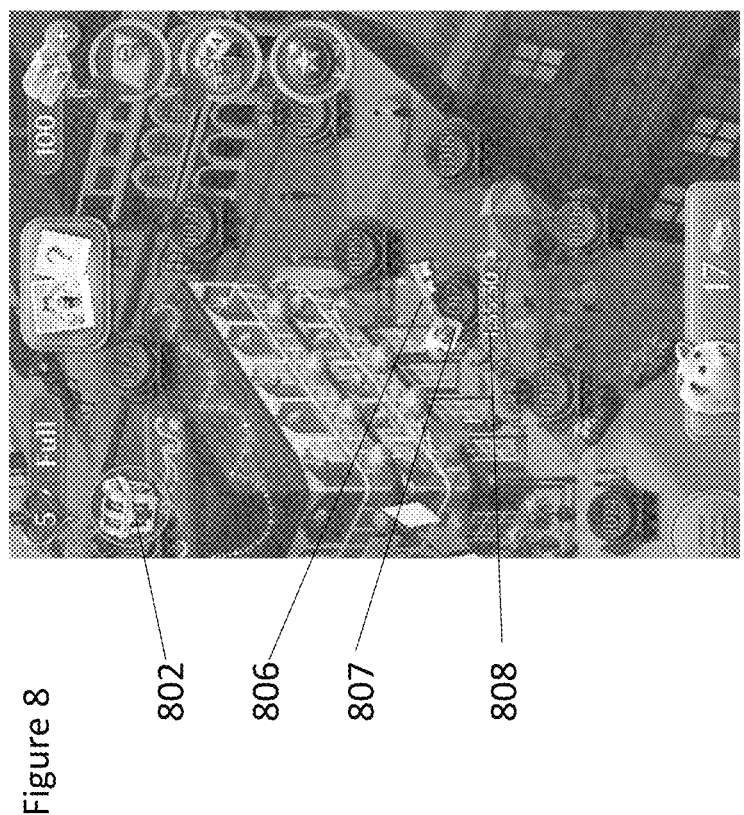
FIG. 8 shows an example of a map of different levels with a second reward item shown.

Reference is made to FIG. 8 which shows the map displayed on the display for the game of FIG. 7. The user has reached the level 1013 and acquired the chest 802. The image displayed indicates to the user that they have acquired or now own the chest. This may be conveyed by displaying the first reward item in a particular location or in a particular manner on the display. The second reward item 806 is displayed on the display in the form of a key by level 1017, referenced 807 along with a time information 808. The time information may be displayed in any suitable format and/or at any suitable location. In the example of FIG. 8, the time information is displayed adjacent the second reward item and displays the remaining time.

Some embodiments may improve user engagement. For example, the time limitation is a driver utilizing scarcity mechanics driving players to play and engage further with the game. In some embodiments, by randomizing one or both of the first and second reward item improves user engagement. The randomness of the drop happening will appeal to the drive of curiosity. By varying the provided reward, in some embodiments, user engagement is improved. Some embodiments are able to improve user engagement even if the game is being played on a device such as a smart phone or the like with a limited display. Processing and/or memory resources may be limited in such devices for games.

In some embodiments, the at least one processor may be configured to perform one or more of the steps of FIGS. 4*a* and 4*b* and/or FIG. 9.

In some embodiments, there may alternatively be a single step process to achieve a reward. In this example there is only a first reward item and no second reward item. For example, a time limited opportunity may be provided. The associated time limited may be displayed. For example a first reward item may be provided in association with a level. This may be visually represented on the display, in a similar manner to previous examples. The first reward item may be visually represented by an item such as a treasure box. The first reward item may displayed in association with a level a few levels ahead or the next level ahead of the current level of the player. If the player does not reach that level associated with the first reward item within a given time limit, the first reward item may be removed. The player may be required to complete the previous level so that the player is able to play the level associated with the item to obtain the first reward item or an associated game reward. In other embodiments, the player may be required to complete the level associated with the first reward item to obtain the first reward item or the associated game reward. The game reward may be as previously described.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device configured to provide a computer implemented game, the computer device comprising a display, a user interface, at least one memory, and at least one processor, wherein:
   the at least one processor is configured to cause said display to display a plurality of different levels of the computer implemented game and a first reward item, at least one of said plurality of different levels being a level of said computer implemented game which has yet to be completed, said first reward item being associated with a first level of said computer implemented game which has yet to be completed, wherein each of the plurality of different levels has a goal to be completed to complete the associated level;
   the at least one processor is configured to determine that a player of said computer implemented game has satisfied an objective associated with said first level associated with said first reward item and in response cause a time limit to be started by which an objective associated with a second different level has to be satisfied, said time limit being defined with respect to the satisfying the objective associated with the first level; and
   the at least one processor is configured to determine if said player of said computer implemented game has satisfied said objective associated with said second level within said time limit and if so, cause a reward associated with the first reward item to be provided.

2. The computer device as claimed in claim 1, wherein said first level has to be completed before said player can progress to said second level.

3. The computer device as claimed in claim 1, wherein said first level is separated from said second level by at least one other level.

4. The computer device as claimed in claim 1, wherein said at least one processor is configured to cause said display to display a second reward item when said objective associated with said first level has been satisfied, said second reward item being associated with the second different level of said computer implemented game.

5. The computer device as claimed in claim 4, wherein said at least one processor is configured to provide the second reward item in response to determining that the objective associated with the second level has been satisfied within said time limit, wherein said second reward item enables the reward associated with the first reward item to be provided.

6. The computer device as claimed in claim 5, wherein the first reward item comprises one of a key and a chest, and the second reward item comprises the other one of the key and the chest.

7. The computer device as claimed in claim 1, wherein said at least one processor is configured to determine that said objective associated with said first level has not been satisfied within the time limit, and in response to cause said first reward item to be removed from the display.

8. The computer device as claimed in claim 1, wherein said at least one processor is configured to determine that said objective associated with said first level has not been satisfied within the time limit, and in response to cause a further first reward item to be provided with a respective time limit.

9. The computer device as claimed in claim 1, wherein said at least one processor is configured to determine if the computer device is online and to only cause said first reward item to be provided if said computer device is online.

10. The computer device as claimed in claim 1, wherein said at least one processor is configured to determine a current level of said player and in dependence on said current level determine if said first reward item can be provided.

11. The computer device as claimed in claim 1, wherein said computer implemented game comprises a plurality of sets of levels and said at least one processor is configured to determine a current level of said player within a respective set of levels and only provide said first reward item if there are more than n levels to an end of said respective set of levels, where n is an integer.

12. The computer device as claimed in claim 1, wherein said at least one processor is configured to determine when said first reward item is to be provided using a random or pseudo random criteria.

13. The computer device as claimed in claim 1, wherein satisfying said objective associated with said first level comprises at least one of:
reaching said first level; and
completing said first level.

14. The computer device as claimed in claim 1, wherein satisfying said objective associated with said second level comprises at least one of:
reaching said second level; and
completing said second level.

15. A computer implemented method performed by a computer device configured to provide a computer implemented game, the computer device comprising a display, a user interface, at least one memory, and at least one processor, which are configured to perform the method of:
causing said display to display a plurality of different levels of the computer implemented game and a first reward item, at least one of said plurality of different levels being a level of said computer implemented game which has yet to be completed, said first reward item being associated with a first level of said computer implemented game which has yet to be completed, wherein each of the plurality of different levels has a goal to be completed to complete the associated level;
determining that a player of said computer implemented game has satisfied an objective associated with said first level associated with said first reward item and in response cause a time limit to be started by which an objective associated with a second different level has to be satisfied, said time limit being defined with respect to the satisfying the objective associated with the first level; and
determining if said player of said computer implemented game has satisfied said objective associated with said second level within said time limit and if so, cause a reward associated with the first reward item to be provided.

16. The method as claimed in claim 15, wherein said first level has to be completed before said player can progress to said second level.

17. The method as claimed in claim 15, wherein said first level is separated from said second level by at least one other level.

18. The method as claimed in claim 15, comprising causing said display to display a second reward item when said objective associated with said first level has been satisfied, said second reward item being associated with the second different level of said computer implemented game.

19. The method as claimed in claim 18, comprising providing the second reward item in response to determining that the objective associated with the second level has been satisfied within said time limit, wherein said second reward item enables the reward associated with the first reward item to be provided.

20. The method as claimed in claim 19, wherein the first reward item comprises one of a key and a chest, and the second reward item comprises the other one of the key and the chest.

21. The method as claimed in claim 15, comprising determining that said objective associated with said first level has not been satisfied within the time limit, and in response causing said first reward item to be removed from the display.

22. The method as claimed in claim 15, comprising determining that said objective associated with said first level has not been satisfied within the time limit, and in response causing a further first reward item to be provided with a respective time limit.

23. The method as claimed in claim 15, comprising determining if the computer device is online and only causing said first reward item to be provided if said computer device is online.

24. The method as claimed in claim 15, comprising determining a current level of said player and in dependence on said current level determining if said first reward item can be provided.

25. The method as claimed in claim 15, wherein said computer implemented game comprises a plurality of sets of levels and the method comprises determining a current level of said player within a respective set of levels and only providing said first reward item if there are more than n levels to an end of said respective set of levels, where n is an integer.

26. The method as claimed in claim 15, comprising determining when said first reward item is to be provided using a random or pseudo random criteria.

27. The method as claimed in claim 15, wherein satisfying said objective associated with said first level comprises at least one of:
reaching said first level; and
completing said first level.

28. The method as claimed in claim 15, wherein satisfying said objective associated with said second level comprises at least one of:
reaching said second level; and
completing said second level.

29. A non-transitory computer program product comprising a computer-readable storage device encoded with instructions which, when executed on a processor of a computer device cause the computer device to be configured to provide a computer implemented game, said computer device comprising at least one memory, at least one processor, a user interface, and a display, said instructions when executed by the at least one processor configure the computer device to:

display on the display a plurality of different levels of the computer implemented game and a first reward item, at least one of said plurality of different levels being a level of said computer implemented game which has yet to be completed, said first reward item being associated with a first level of said computer implemented game which has yet to be completed, wherein each of the plurality of different levels has a goal to be completed to complete the associated level;

determine that a player of said computer implemented game has satisfied an objective associated with said first level associated with said first reward item and in response cause a time limit to be started by which an objective associated with a second different level has to be satisfied, said time limit being defined with respect to the satisfying the objective associated with the first level; and determine if said player of said computer implemented game has satisfied said objective associated with said second level within said time limit and if so, cause a reward associated with the first reward item to be provided.

\* \* \* \* \*